May 17, 1960 J. S. PARSONS 2,936,950
NAVIGATIONAL COMPUTING AND INDICATING APPARATUS
Filed May 8, 1953 2 Sheets-Sheet 1

Inventor
JAMES STUART PARSONS

By W. K. Meredith
Attorney

May 17, 1960  J. S. PARSONS  2,936,950
NAVIGATIONAL COMPUTING AND INDICATING APPARATUS
Filed May 8, 1953  2 Sheets-Sheet 2

Inventor
JAMES STUART PARSONS
By W. R. Meredith
Attorney

United States Patent Office 2,936,950
Patented May 17, 1960

2,936,950

NAVIGATIONAL COMPUTING AND INDICATING APPARATUS

James Stuart Parsons, Ottawa, Ontario, Canada, assignor, by mesne assignments, to Canadian Patents and Development Limited, Ottawa, Ontario, Canada, a company Application May 8, 1953, Serial No. 353,854

3 Claims. (Cl. 235—61)

This disclosure concerns a computing instrument having use in the navigation of a dirigible craft, particularly of a high-speed aircraft. The invention herein described relates to relative-position indicating apparatus which displays craft position with respect to a known reference position.

In apparatus of this sort quantities representing the north-south Y and the east-west X components of motion of a craft with respect to the air mass in which it moves are combined with quantities representing the relative motion of the air mass with respect to the reference co-ordinate system, to produce indications of the relative displacement of the craft from a reference point. One such apparatus is disclosed in U.S. Patent 1,985,266, dated Dec. 25, 1934, granted to R. H. Smith and J. P. W. Vest.

Navigational apparatus for use in aircraft is really useful only if it provides the pilot with three essential sets of reliable information simultaneously: where he is, where his destination is in relation to where he is, and how he must steer to get there. The value of the apparatus will depend in great degree upon the ease and accuracy with which corrections may be made on it, or alternative destinations may be set into it. The invention is therefore concerned with improving over the prior art with respect to these essential features. In particular, this invention is conceived as a solution of the problem of providing an automatic dead-reckoning navigational instrument for the continuous determination of present position as a function of craft heading, air speed, and wind, with direct and simple display of such position, having in addition the feature that selected vector quantities may be inserted whereby the display may be rapidly adjusted to indicate other reference positions.

To the realization of this solution, an apparatus is provided in which a high speed drive input representing a vector setting rate and a relatively low speed drive input representing a wind velocity are combined by a summing differential as a single motion, whereby a pair of crossed-marker indicators are driven according to components of the motion to new positions indicative of a vector displacement, the operation being carried out over an interval of time short enough that the wind velocity may be disregarded, by drive mechanism which arrests the high speed drive input upon completing the re-setting.

For completeness of the disclosure, description is included of means whereby the indicators may be adjusted rapidly to provide a display whereon the indication is scaled either in continuously variable units of distance, or in discrete ranges, more fully described in application Number 353,853 of James S. Parsons and not forming part of the present invention.

In the disclosure reference is made briefly to a means for displaying craft position, a reference position, craft heading, and wind or vector direction by a display system whereon the respective indicators are superimposed, in an apparatus embodying the present invention, and being the subject matter of application.

One of the serious problems in navigating high-speed craft of limited endurance, particularly for pilots training in high-speed jet-driven military craft, is the calculation of present position. Unless the relative position of a destination can be accurately determined, the pilot may quickly become lost, and may dangerously deplete the fuel supply while hunting for landmarks to orient himself by. It may become necessary during a flight to abandon a previously chosen destination because of low remaining fuel, or weather conditions at an airport, and to choose an alternative landing field. The most useful information to the pilot in such circumstances is a solution of course to be flown, and the distance from his present point to the destination. Hence an automatic dead-reckoning instrument capable of rapid adjustment of destination (hereinafter designated "reference position") is a device urgently required. No prior art device provides this essential facility, whereby a pilot flying on a course towards a first destination may, if circumstances demand, adjust the instrument quickly to provide him with a new course to be flown to an alternative destination.

It is therefore one of the objects of this invention to provide in an automatic dead-reckoning navigational instrument, means for setting into the apparatus a correction whereby the reference position may be adjusted rapidly to a new reference position by the amount of the inserted correction.

A further object of the invention is the provision of a counter whereby the magnitude of the displacement of the air mass with respect to the earth over an interval of time is recorded and continuously indicated.

It is another object of the invention to arrange a single counter to register both the wind displacement effect and the absolute magnitude of the vector quantity representing a desired shift of the reference position.

Still another object of the invention is the provision of apparatus whereby the whole of a wind displacement effect which has been registered over an interval of flight time may be subtracted rapidly from the indicator, or, alternatively, a vector magnitude inserted into the counter may be transformed rapidly into a new reference position.

The above and other objects of the invention will be made apparent from a reading of the disclosure with reference to the figures of drawing, wherein an embodiment illustrative of the practice of the invention is more fully described.

Figure 1:
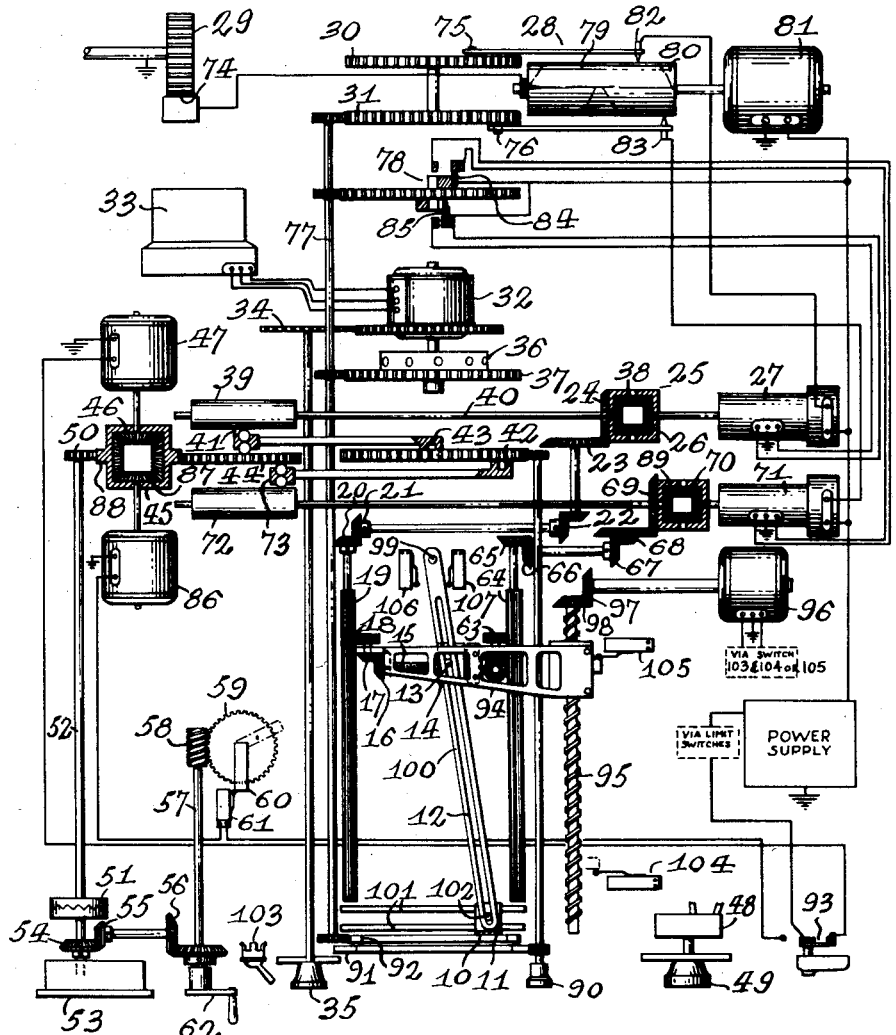
Fig. 1 is a general view of the elements in their operational relationships shown in plan.

In the apparatus of Fig. 1, an indicator member 10 in the form of a filament or engraved line carried on a strip between upper and lower blocks 11 is moved by the action of pivoted link member 12 according to the east-west displacement of a reference position with respect to the craft position. Link member 12 is actuated by pin 13 carried by the block 14 which in turn is moved along threaded shaft 15 by gears 16 and 17. Drive gear 18 is arranged to engage and slide along splined shaft member 19 which is positioned normally of the face of the instrument. Bevel gear 20 is fastened to the extension of the splined shaft 19 and receives its motion from the gear train 21, 22, 23, and the cage or carrier 24 of differential 25. The differential receives an input to side wheel 26 from reversible stepping motor 27, representing the east-west component of air-miles displacement, derived from the east-west element of the resolver 28 which operates on the output of the electrical air-miles log or commutator 29 and the azimuthal setting of elements 30 and 31 actuated from repeating compass 32. A master compass 33 is carried elsewhere on the craft, for example a gyro-compass or alternatively a magnetic compass of the earth inductor type or a magnetic compass having means for driving repeating units. In the event that a master magnetic compass is used the necessary corrections for variation and azimuthal error are inserted. In the apparatus shown, repeating compass 32 is rotated relatively to the instrument frame by gear 34 at one end of the shaft which extends to a control point 35 at the face of the instrument, whereby a variation setting is applied to correct the compass to true north. Correcting member 36 intermediate the output gear 37 and the compass shaft serves to correct the indicated compass heading according to a calibration pattern, and may be of any known type, preferably of a cam-follower form. A pointer carried on dial member 92 is set by rotation of shaft 77.

The differential 25 receives another input to side wheel 38 from the cylindrical friction member 39 by way of shaft 40, representing the east-west wind miles component. The position of the balls 41 along the length of cylinder 39 is determined by the azimuthal setting of gear 42 and pin 43 associated with the planetary resolver. It will be understood that the mechanism is a mechanical sine-cosine resolver of known type, illustrated herein as a planetary gear not shown) carried by the azimuth gear 42 whereby pin 43 generates a transverse motion representing a sine function of the azimuthal angle. The disc member 44 is driven at a rate corresponding to the wind velocity from the cage or carrier of differential 45 into which input motion is imparted by side wheel 46 from motor 47. Control of the speed of motor 47 is provided by adjustable resistance 48 in association with control device 49.

The motion of the cage or carrier of differential 45 is transmitted by gear 50, clutch member 51, and shaft 52 to register 53, whereon the cumulative effect of the wind is recorder and indicated. Bevel gear 54 transmits the rotation of shaft 52 to the gears 55, 56, to cause shaft 57 to rotate worm 58 and gear 59. Limit stop means 60 affixed to gear 59 is consequently displaced from the switch device 61, here illustrated as a microswitch, by an amount proportional to the accumulated wind effect. An extension of shaft 57 to the face of the instrument permits crank device 62 to be engaged with the end thereof for displacing the limit stop by any desired amount, for the purpose of adjusting the wind effect, or, as will be described, for inserting a vector.

Clutch member 51 will slip when a manual setting is inserted by crank 62, so that register 53 will record the magnitude of the change without disturbing the input to disc 44.

In the foregoing description, the method of combining the east-west component of the craft displacement relatively to the air with the east-west component of the wind has been set forth. In a similar manner, the north-south components of motion are combined, as follows:

An indicator member (not shown) similar to member 10 is arranged to be moved at right angles to the motion of member 10 according to the north-south displacement of a reference position with respect to the craft position, by a link member and an actuating carriage, in a manner similar to the east-west motion indicator aforementioned. Drive gear 63 is arranged to drive the carriage from splined shaft member 64 which is positioned at right angles to the face of the instrument. Bevel gear 65 is fastened to the extension of the splined shaft 64 and receives its drive from the gear train 66, 67, 68 and the cage or carrier 69 of differential 70. The differential combines inputs from the reversible stepping motor 71 representing north-south air miles and from the cylindrical friction member 72 whose rotation represents north-south wind effect. The position of ball cage 73 is determined by the azimuth setting of gear 42 whereby the rotation of the cylinder 72 is proportional to the product of the cosine of the azimuth angle and the wind velocity.

As has been explained previously, an input of air-miles data or an air log is obtained in the form of electrical pulses, where the significance of one pulse is one unit displacement of the craft relative to the air. For example, a sensing member of known type is arranged to trace a helicoidal path in space as the craft moves forward, and associated commutator means such as indicated at 29 is rotated through an angle such that one segment passes under a brush or wiper 74. The train of constant amplitude pulses so produced may be counted or integrated over an interval to register total displacement. In order to form new trains of pulses representing the east-west and the north-south components of motion, an electromechanical resolver 28 is provided. The mechanical resolver portion may be of known type, whereby in accordance with the azimuthal angle of craft heading, pins 75 and 76 are displaced from a reference position by amounts which are respectively proportional to the sine and cosine functions of the angle. As shown in the diagram, shaft 77 is actuated from the repeating compass 32 to position elements 30 and 31 of the resolver. Also actuated by shaft 77 is quadrant switch member 78 which will be described later.

Electrical input pulses from brush 74 are passed to the conducting surface 79 on drum 80 which is arranged to be rotated by an independent motor 81. The shaft rotational speed is unrelated to the input pulse rate, which is a quantity variable with craft speed. The conducting surface on drum 80 is a sheet in the form of an isosceles triangle, the base of which is parallel with the axis of the drum. The displacement of contact points 82 and 83, driven respectively from pins 75 and 76, is arranged so that when the azimuth angle is 90 or 270 degrees, the track of point 82 is along the bisector of the apical angle of the conducting sheet, while at such times as the azimuthal angle is zero or 180 degrees the track of contact point 83 is along the bisector. It will be obvious that within the range of displacement of either point between the extreme left and extreme right ends of the conductive surface, the trains of pulses collected will represent the products of the input pulse train multiplied by factors having values lying between zero and unity, according to the sine or cosine function of the azimuthal angle. More specifically, for any substantially fixed heading, a given rate of input pulses from the air log commutator 29 will be converted into two pulse trains, which if integrated over an interval of time will represent respectively the east-west and north-south components of motion. I have found that the conversion of the input electrical pulse train into the cardinal components in the manner described provides an accurate resolution.

Associated with the outputs of point contacts 82 and 83 are quadrant switches 84, 85 by which the summing of the resolved pulse trains is controlled to represent positive components (north and east) or negative components (south or west). The trains are converted or integrated to produce mechanical rotation by stepping motors 27 and 71 which may be of a known type capable of forward or reverse counting, but which preferably are of the form described more fully in my copending application Serial Number 353,853, filed May 8, 1953. Briefly, the apparatus comprises an electromagnetically actuated escapement responsive to an applied electrical pulse associated with a toothed wheel driven by a motor, the latter being of the rapidly reversible type, and designed to withstand continuous application of full voltage in stalled condition. For each actuation of the escapement, the motor shaft is permitted to rotate one tooth distance, in a direction determined by the quadrant switches associated therewith. Hence, over a period of time during which a craft is travelling at a fairly steady air speed and along a substantially constant heading, each pulse of each resolved pulse train will be summed algebraically to produce a shaft rotation at the input to the associated differentials 25 and 70.

An additional input is provided to differential 45 at which the wind effect represented by shaft rotation velocity of motor 47 is combined with this input. Whereas the wind effect is essentially a low velocity, for example not exceeding perhaps 100 knots, the angular velocity of the shaft of motor 86 and hence of side wheel 87 is arranged to be the equivalent of many times this velocity, for example, the rate may be proportional to 100,000 knots or higher. When motor 86 is energized, cage or carrier 88 will be rotated at high speed, causing friction cylinders 39 and 72 to drive side wheels 38 and 89 of displacement combining differentials 25 and 70, whereby the reference position indicated on the face of the instrument is shifted rapidly. The direction of shift will be along the direction set into member 42 by control means 90, as indicated by marker dial 91, the sense of the direction being according to the label "Vector," in contradistinction to the direction labelled "Wind."

Figure 2:
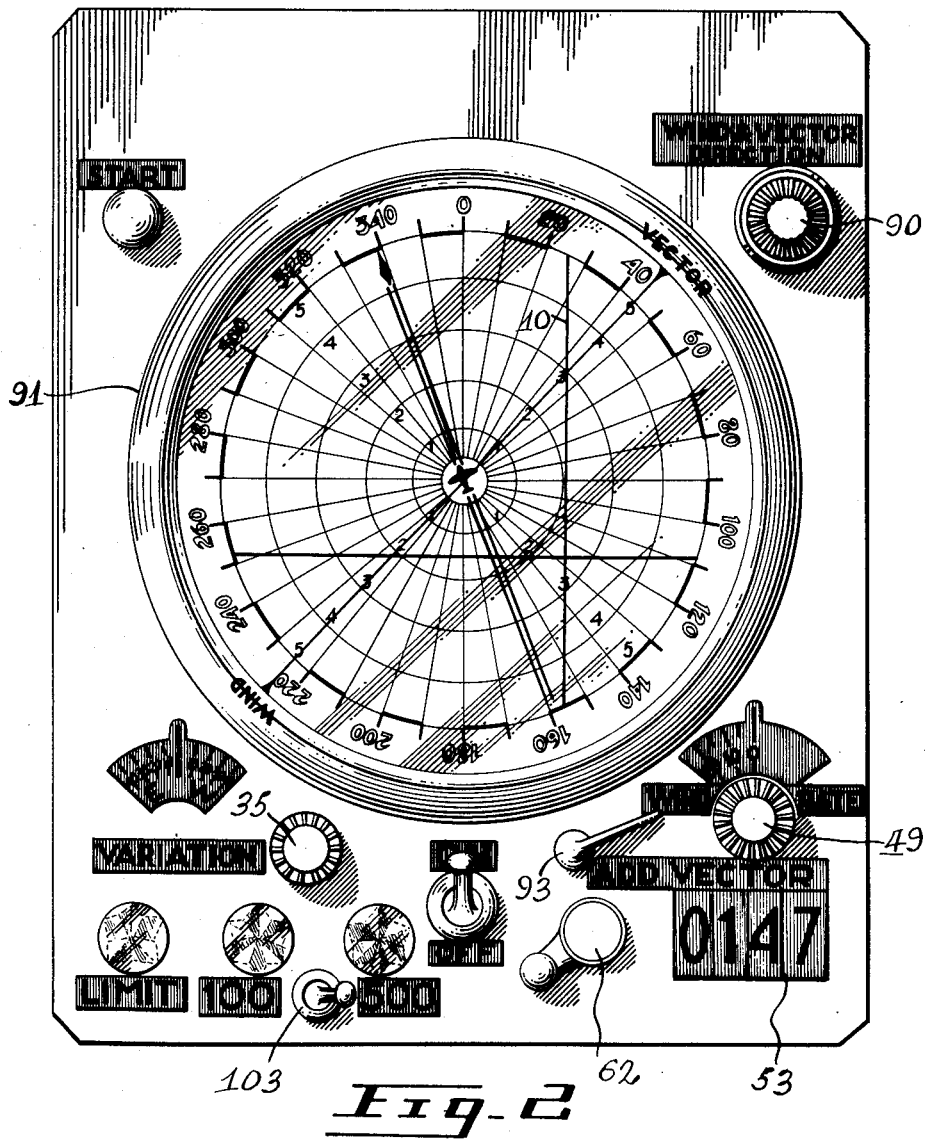
Fig. 2 is a frontal view of the instrument showing indicators and control elements of a complete apparatus incorporating an embodiment of the invention.

The utility of the feature described in the foregoing matter will be now elaborated, having reference to both Fig. 1 and Fig. 2 of the drawing. Let it be supposed that a pilot wishes to shift the reference position of the crossed-marker indicators from the indication representing take-off point, which would have been his destination for this flight, to an indication representing an alternative destination. By reference to a map, or from previously preferred information of course and distance of alternative positions with respect to take-off point, he determines that the vector representing the desired shift of reference point is 147 miles, and direction 44 degrees. To make the adjustment, the resolver member 42 is first adjusted by setting the pointer marked "Vector" (in Fig. 2) to indicate 44 degrees azimuth angle, and handle 62 engaged with shaft 57 is turned until the indicator of register 53 reads 147 miles. It will be noted that any previous reading representing accumulated wind effect need not be taken into account. Limit stop means 60 will now be displaced angularly to a new position representing 147 miles, as indicated by the dotted line position. As soon as the vector parameters (scalar magnitude and azimuthal angle) have been set in, switch member 93 is thrown to the "Add vector" position, whereby motor 86 is caused to drive the cage or carrier 88 of differential 45 at high speed. The reading on register 53 is rapidly reduced and simultaneously the angular position of limit stop means is returned to zero position. At the time that the counter is cleared, limit switch 61 opens the motor circuit and the high-speed drive is arrested. At this point switch member 93 should be returned to "Wind rate" position, and the appropriate wind direction is now set in at its azimuth value, by manipulation of the control knob 90 until the pointer marked "Wind" indicates the direction from which the wind is blowing.

The foregoing operation has been shown to shift the crossed-marker indicators on the face of the instrument to occupy a new position representing a location 147 miles northeast of the previous reference position, in a direction defined by 44 degrees azimuth angle. The time taken for the whole operation is small. It will be noted that by virtue of the use of common azimuth resolver apparatus for both the wind effect and vector addition, there is a slight loss of wind information during this adjustment, unless of course the circumstances are that the setting of member 42 does not require to be changed, for which condition no error is introduced. This condition would obtain whenever the vector direction and wind direction differ in azimuth by 180 degrees. For other conditions, little discrepancy if any at all will be introduced as the adjustment requires only a fraction of a minute and can be made as short as is practical, hence the component of drift due to wind may be neglected.

It is to be noted that the pointers marked "Vector" and "Wind" are oppositely directed, this arising out of the convention that the meteorological definition of wind direction is the azimuth angle toward the "source" of the wind.

It is also to be noted that after the operation of shifting the reference position by addition of a vector, the accumulated wind effect shown on the register is wiped out, although there is no effect on the wind components of motion which have been computed and included in the crossed marker indications. In many instances the removal of the tally on the register is of no importance, but if it is desired to keep track of the total wind effect over an interval, it is possible to note the reading on the register prior to making any change, and after the adjustment to insert the tally by means of crank 62.

The apparatus is also adaptable to derive true wind rate over an area, where it is possible at intervals in a flight to identify ground position either by direct observation or from information communicated to the craft. Having knowledge of the co-ordinates of actual position, the pilot may compare these with the indicated position. If there is reason to attribute any discrepancy as a result of having inserted inaccurate settings of wind velocity and direction at the start of the flight, a fairly simple computation may be made to derive the correct average wind values, and these may be used for a further interval of flight after the indicator is shifted to correct position.

As an example of the foregoing operation, if after one hour of flight the pilot identifies his ground position as 12 miles east and 6 miles south of the position indicated on the instrument, which will be apparent to him from a map or other information of the correct relation between his ground position and the reference position, he will know that the wind rate set in is in error (low) by 12 miles per hour easterly component, and 6 miles southerly component. Accordingly, the indicator may be corrected and the "Wind rate" and wind direction controls may be used to approximately their correct values.

An alternative operation which may be performed by means of the apparatus, particularly for use on long flights in areas where meteorological data may be inadequate, will yield information of the wind effect more directly, as will now be explained. Let it be supposed that as before, after a period of flight with inaccurate wind values set into the computer, a discrepancy is noted between the indicated craft position and a ground position established by observation or other information. The computer may be cleared rapidly of that contribution to position due to the wind values used, without any computations required of the pilot, merely by rotating the member 42 by 180 degrees, thereby setting the pointer end marked "Vector" to the azimuthal angle previously indicated by "Wind," and by throwing switch 93 to the "Add vector" position. As was shown hereinbefore, the accumulated wind effect indicated on the register 53 will be reduced to zero, and the crossed markers will be located automatically at a new position, indicative of air-miles travelled. The discrepancy now observed from the instrument between the co-ordinates of the reference position indicated and the known values of ground position may be interpreted as the total wind effect. Since the effective direction of the wind is more clearly seen by this method, it is possible to set in the correct magnitude; a simple computation of elapsed time and observed difference yields the wind velocity. The indication of the crossed-markers may now be set to a position representing observed ground position, or, if now the pilot deems it advisable to indicate the destination, the following steps may be taken:

The crossed-marker indicators can be set on zero, i.e. coincident with the center of the instrument face or on craft position; this represents present ground position. Then, by further operation of crank 62, a vector pertaining to his chosen destination may be set into the register, and, following the steps outlined previously for inserting a vector, the crossed-marker indicators will be shifted to indicate this destination. The flight may then be continued under the guidance of the crossed-marker indicators, in the usual way.

Associated with the embodiment of the invention described is a feature which facilitates the preceding operation, namely, a means for changing the scale of the display, which is not part of the present invention but which is described here for a better understanding of the use of the vector-setting feature. As was explained earlier, the motion of the east-west marker line 10 is governed by a transverse motion of the pin member 13 carried by block 14, arising out of the rotation of splined shaft 19 upon which gear 18 is slideably engaged. Carriage 94 may be displaced fore-and-aft in a direction parallel with shaft 19 in dependence upon the rotation of lead screw 95, when reversible motor 96 is energized, driving gears 97 and 98. Link member 12 is caused to pivot about point 99 while pin 13 slides along its length and engages slot 100. The block 11 is constrained to move along guide rods 10, while pin 102 is free to move along slot 100.

It will be readily appreciated that the device makes use of the geometry of similar triangles to achieve proportional displacement of indicator 10 relatively to pin 13. The lateral motion of the East-West marker line carried by block 11 is a magnified motion of block 14, by a factor depending on the position of carriage 94. If the distance between centers of pins 99 and 13 is called "A," and that between pins 99 and 102 is called "B," the magnification factor is: $B/A$. While it is possible to arrange that distance "A" can equal distance "B," for direct motion of marker 10, it is equally useful to limit distance "A" to be somewhat shorter than "B." If the limit position of pin 13 is at the distance "$A_1$," then for any position of pin 13 less than this, the factor becomes: $A_1/A$.

Hence for any position of carriage 94 within pre-determined limits a corresponding distance scale is derived in respect of the indicating crossed-markers. It will be understood quite readily that any number of suitable distance scales may be pre-set.

For navigation near reference positions, it is obviously important to be able to interpret distance indications more accurately than when distances are large. Accordingly, a distance scale of 500 miles radius and another scale of 100 miles radius may be used for an instrument of the type described, with as many other scales as may be desirable. When making a correction of wind velocity during a flight, for example, a short distance scale is preferable.

A scale selector switch 103 on the front panel controls the power supply to motor 96 by way of either of limit switches 104 and 105, arranged to be actuated by a stop fixed to carriage 94. When limit switch 104 is in the selected circuit, motor 96 will bring the carriage up to this limit, and the motion of crossed-marker indicators over the face of the indicator area will be according to the long-range scale, while if limit switch 105 is in circuit, the short-range scale will apply.

In the event that either one of the indicators of the crossed-marker systems is displaced to the margin of the display area, a limit device is provided, whereby all input motions are arrested. This device may be, for example, an arrangement of sensing switches, such as east-west limit switches 106, 107, and another set (not shown) of north-south limit switches so that for each coordinate axis a displacement exceeding a limit electrically de-energizes the component summing operation, and a lamp marked "Limit" is lit. If this occurs when the display is operated in a short distance scale, the operator may change to the longer distance scale, causing the crossed-markers to be retracted towards the center. A reset button marked "Start," shown in Fig. 2, is then pressed to restore the instrument to operative condition.

While, in the foregoing, reference has been made to one embodiment only of the invention, it will be recognized that numerous other combinations of equivalent elements may be arranged in accordance with the teachings of the invention to realize further embodiments thereof.

The embodiments of the invention in which an exclusive property or privilege is claimed are defined as follows:

1. A relative-position computing and indicating apparatus comprising a crossed-marker indicator system for indicating a computed position, individual drive means effective to cause displacement of each marker, a pair of differential gearing devices each having first and second inputs and an output, coupling means between each output and an associated drive means for each marker, a pair of first drive transmitting means effective to drive each respective first input of the pair of differential gearing devices according to the computed value of respective X and Y components of a first motion, a variable speed drive device, a fixed high speed electrical drive device, a third differential gearing device having an output and two inputs, respectively, driven by said variable speed drive device and by said fixed high speed drive device, drive resolver means operatively coupled to said third differential gearing device output whereby drives are imparted to said pair of first drive transmitting means, a counter, means connecting said third differential gearing device output to operate said counter in a positive counting sense in response to drive imparted by the variable speed device, and in a negative counting sense in response to drive imparted by the high speed device, limit stop means associated with the counter and a limit stop switch in circuit with said high speed drive device actuated by said limit stop means to arrest the fixed high speed device when the counter reading is zero, which limit stop switch is closed for any non-zero reading.

2. The apparatus of claim 1 wherein the variable speed drive device is an electric motor having substantially linear speed-voltage characteristics.

3. The apparatus of claim 1 further including switch means connected in circuit with said variable speed drive device and said high speed drive device whereby said switch means may be selectively connected to said variable speed drive device or said high speed drive device.

References Cited in the file of this patent

UNITED STATES PATENTS

| | | |
|---|---|---|
| 1,985,266 | Smith | Dec. 25, 1934 |
| 2,428,770 | Albert | Oct. 14, 1947 |
| 2,571,484 | Reilly et al. | Oct. 16, 1951 |